United States Patent [19]

Yubazaki et al.

[11] Patent Number: 5,153,822
[45] Date of Patent: Oct. 6, 1992

[54] PROGRAMMABLE LOGIC CIRCUIT WITH DELAYED INPUT AND FEEDBACK

[75] Inventors: Naoyoshi Yubazaki; Haruhiko Arikawa, both of Kyoto, Japan

[73] Assignee: Mycom Kabushiki Kaisha, Kyoto, Japan

[21] Appl. No.: 845,550

[22] Filed: Mar. 4, 1992

Related U.S. Application Data

[63] Continuation of Ser. No. 409,903, Sep. 20, 1989, abandoned.

[30] Foreign Application Priority Data

Nov. 21, 1988 [JP] Japan ................... 63-295793

[51] Int. Cl.$^5$ ................... G06F 9/26
[52] U.S. Cl. ................... 364/140
[58] Field of Search ................ 364/140, 141, 142, 716

[56] References Cited

U.S. PATENT DOCUMENTS

| | | | |
|---|---|---|---|
| 4,393,469 | 7/1983 | Boute | 364/900 |
| 4,415,818 | 11/1983 | Ogawa et al. | 364/716 |
| 4,628,435 | 12/1986 | Toshiro et al. | 364/141 |
| 4,700,326 | 10/1987 | Florine | 364/140 |
| 4,744,022 | 5/1988 | Kumar et al. | 364/142 |
| 4,963,768 | 10/1990 | Agrawal et al. | 364/716 |

OTHER PUBLICATIONS

H. R. van Nauta Lemke and Wang De-Zhao, "Fuzzy PID Supervisor", 1985 from 24th IEEE Conference on Decision and Control, vol. 1, pp. 602-608.

*Primary Examiner*—Jerry Smith
*Assistant Examiner*—Patrick D. Muir
*Attorney, Agent, or Firm*—Armstrong, Nikaido, Marmelstein, Kubovcik & Murray

[57] ABSTRACT

A programmable logic circuit includes a memory sector and other logic elements which are laid peripherally, wherein the memory sector is prestored with possible input data and output data which are derived by fuzzy reasoning. In application, observed data on an objective entity outside is first treated by a logic element to convert the data to digital form and then input as an address in the memory sector wherein the input observed data is converted by fuzzy logic to an operative data, which is sent to downstream to subsequent circuit elements to control a device. The illustrated embodiment is for an air-conditioning system wherein introduction of a memory sector having fuzzy logic based data will prevent erroneous actions in the downstrem devices which are caused by erroneously input data, in the process of processing data by a conventional programmable logic circuit.

2 Claims, 4 Drawing Sheets

Fig. 2

| Temp. zone | Δt | | Rotation speed |
| --- | --- | --- | --- |
| | Rising process | Falling process | |
| Z0 | $-3 \geq \Delta t$ | $-2.5 \geq \Delta t$ | OFF |
| Z1 | $-1.5 \geq \Delta t > -3$ | $-1 \geq \Delta t > -2.5$ | OFF |
| Z2 | $-0.5 \geq \Delta t > -1.5$ | $0 \geq \Delta t > -1$ | 1 |
| ⋮ | ⋮ | ⋮ | ⋮ |
| Z9 | $3.0 \geq \Delta t > 2.5$ | $3.5 \geq \Delta t > 3.0$ | 8 |
| Z10 | $\Delta t > 3$ | $\Delta t > 3.5$ | 9 |
| | ↑ 201 | ↑ 202 | ↑ 203 |

PROGRAMMABLE LOGIC CIRCUIT WITH DELAYED INPUT AND FEEDBACK

This application is a continuation of application Ser. No. 409,903 filed Sep. 20, 1989, now abandoned.

FIELD OF THE INVENTION

This invention relates to a new programmable logic circuit in which a memory sector is included which is prestored with data to covert possible input observed data to output operative data according to fuzzy logic.

DESCRIPTION OF THE CONVENTIONAL ART

The conventional art is described using air-conditioning as an example.

In the art of air-conditioning for a home, the air-conditioning for maintaining a favorable environment has been intended. For instance, on a winter morning, a room temperature is assumed to be low. Immediate warming up the room is performed. Then, after the temperature is somewhat raised, as the temperature rises, the warming up trend is weakened.

In order to attain an efficient warming, it is necessary to monitor outdoor and indoor temperature and adjust a rotation speed of a compressor motor to comply with changes in the environmental temperature. Commensurate with the speed of the compressor motor, a fan motor mounted in indoor units must be regulated with its rotation speed concurrently.

Thus, superior air-conditioning art requires the control of two motors in view of temp. indoor and outdoor temperature, which causes the control to use many algorithms. Such a situation is often impossible to control using conventional hard logic circuits, which leads to employment of a microcomputer.

However, the employment of a microcomputer in a control system causes inevitably a problem that it is possible for the computer to stray from the normal functions, if it accepts an erroneous program, for instance, caused by noise. Therefore, conventionally, in order to keep possible damage to a minimum, countermeasures have been taken as incorporation of a program to initiate a protective function or to reset the computer.

SUMMARY OF THE INVENTION

This invention intends to enhance reliability or shock-freeness for the process of processing data to be sent downstream and to avoid the use of a microcomputer. In other words, this invention presents a new programmable logic circuit free from problems associated with computer-aided data processing.

Thus, this invention is summarized as a programmable logic circuit which comprises a memory sector and digital logic elements which are posted in a periphery of the memory sector. The memory sector is prestored with possible input abserved data in its application field and correspondent output operative data which are obtained by fuzzy reasoning or fuzzy converse reasoning or other fuzzy logic methods.

The term "fuzzy reasoning" is a term belonging to a more generic concept of fuzzy logic or fuzzy systems, together with other terms: fuzzy converse reasoning, fuzzy set, and membership value, for instance. In this system, terms "observed data" and "operative data" are often used to mean "input data" and "output data", wherein the later, output data, is derived by the fuzzy reasoning or another method. Herein the term "fuzzy reasoning" is used to represent possible other fuzzy approaches.

In the fuzzy system, the observed data is related to the operative data with one-to-one causality or correspondence, which follows that the fuzzy system is regarded as a kind of data conversion from input data to output data. Therefore, assuming that the operative data is previously computed from possible observed data by a computer and that these correspondent data are then stored or written in a hardware chip which is connectable in a stream of digital data processing, this hard chip or actually a memory element can act as a data converter to accept the input data and to deliver the output data which has been treated by the fuzzy logic.

BRIEF DESCRIPTION OF THE DRAWINGS

FIG. 2 is a diagram which shows rotation speeds taken by a compressor motor in response to differences between preset room temperatures and actual temperatures.

These drawings are presented to illustrate the invention and therefore, they should not be interpreted as limiting the invention. In the following, the invention will be explained with reference to the drawings.

DESCRIPTION OF THE EMBODIMENTS

Figure 1:
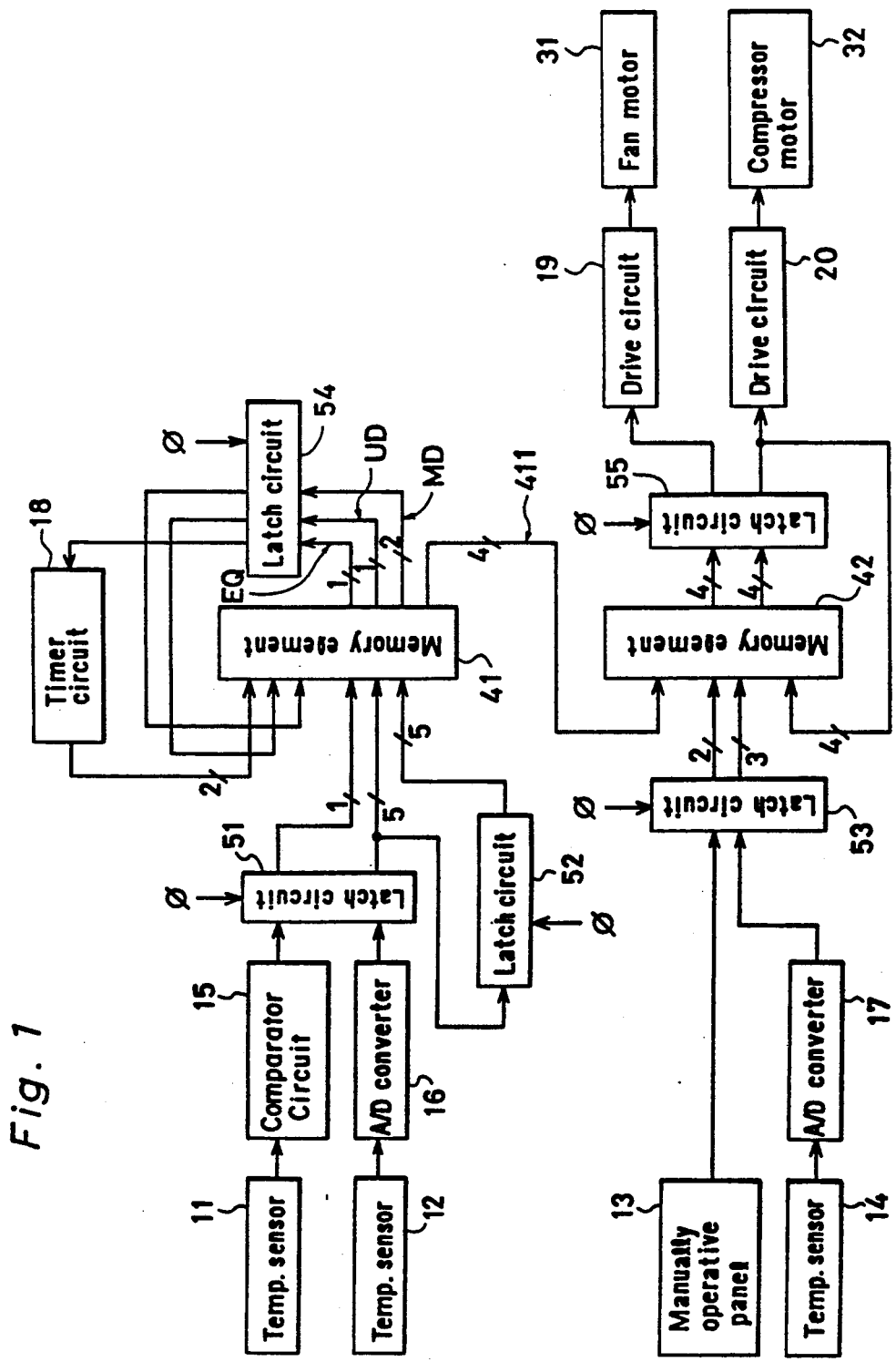
FIG. 1 is a block diagram which shows an electronic configuration in the case where the inventive programmable logic circuit is applied to an air-conditioning system.

FIG. 1 is a block diagram which shows an electronic configuration where the inventive programmable logic circuit is applied to an air-conditioning system.

A temperature sensor 11 senses outdoor temperatures and adjacent to which outdoor units including a compressor motor are laid. Data sensed by the temperature sensor 11 is sent to a comparator circuit 15 where the data is converted into a one bit digit signal, which is sent to a latch circuit 51. A temperature sensor 12 is connected to the outdoor units and is laid in an indoor room, wherein a fan is furnished to circulate the air. Data sensed by the temperature sensor 12 is sent to an A/D convertor 16 where the data is converted into 5 bit digital signal, which is sent to the latch circuit 51.

A memory element 41 comprises a ROM of 64 kilo deytes. The latched data from the computer circuit 15 is as an address input. The latched data which was derived from the A/D converter 16 is output from the latch circuit 51 and input to another latch circuit 52 and input to the address input of the memory element 41, wherein output from the latched circuit 52 is also entered to the same address input of the memory 41.

It is be noted here that a mark of "a numeral with a slash across a line" indicates how many digits are used and that a greek letter: Φ "phi" with an arrow mark means clock signals to determine a latch timing.

The memory 41 outputs 8 bit data or signals, in which 4 bits are sent to the address input of another memory element 42 which takes part of the memory sector together with the memory element 41, and the remaining 4 bits are output to the next latch circuit 54, divided to 1 bit to indicate an occurrence of a change with a temperature zone noted EQ (The temperature zone will be explained later with reference to FIG. 2), 1 bit to indicate a tendency of a change with the same noted UD, and 2 bits to indicate a mode of operations noted MD. From the latch circuit 54, the output EQ is sent to a timer circuit 18, from which 2 bit output to indicate a two minute lapse and a five minute lapse are sent to the input of the memory 41. On the other hand, the output of UD and MD are sent from the latch unit 54 to the same input of the memory 41.

A sensor 14 senses temperatures of a heat exchanger mounted in the indoor units, and the sensor 14 outputs, via an A/D converter 17, 3 bit digital signals to a latch circuit 53. A manually operative element 13 is attached to a control panel and this element 13 outputs 2 bit digital signals which are likewise sent to the same latch circuit 53. Hence, the latched data is sent to the input of the memory element 42.

The memory element 42 outputs 8 bit digits which are sent to a latch circuit 55, wherein two 4-bits are formed from the 8 bits and entered respectively to two drive circuits 19, 20, and wherein the 4 bits input to the drive circuit 20 is branched and one of the branched outputs is sent back to the input of the memory 42. Thence, the drive circuit 19 controls a fan motor 31 and the drive circuit 20 likewise controls a compressor motor 32.

As noted before, the memory sector is comprised of two memory elements 41, 42, and the inventive logic circuit is, in this example, outlined to include the elements referenced by 41, 42, 51, 52, 53, 54, 55, and 18.

Next described are operations involved in the above hardware system. Room temperatures are first sensed by the sensor 12 and are latched, via the A/D converter 16, at the latch circuit 51 in the form of 5 bit data as observed data or measurements, and this 5 bit data is sent to the memory 41 in two ways, directly and via the latch unit 52, which follows that, should there be any difference between the input directly from the latch unit 51 and via the latch unit 52, it proves that some change in room temperature has taken place during a latch time "phi", because the data from the latch unit 52 is one clock unit delayed. That is, where the data from the latch unit 52 is larger than the directly input data, a rise of temperature has taken place and vice versa.

Further, the latched data from the sensor 11 (outdoor use) is designed to act as key data to change its level at the temperature range of 22°-23° C. as a critical zone, that is, below 22° C., it stays at the low level and over 23° C., high level.

As will be apparent as the description proceeds, the embodiment herein includes a combination of two approaches to control the room temperature: first one in response instantaneously to a momentary room temperature and also the other in response to a change for a unit of time.

Therein, the first one is explained according to FIG. 2, wherein a preset temperature is denoted TO, a room temperature is denoted Tin, an outdoor temperature is denoted Tout, and a difference ($\Delta T$) between these two is: $\Delta T = Tout - Tin$, Further, assuming that the difference ($\Delta T$) is divided into 11 zones: Z0–Z10, wherein at each zone a range of the difference ($\Delta T$) is determined in connection to a temperature rise and fall (as shown in FIG. 2 by 201, 202). Codes for indicating frequency indexes 1-9 (the invertor switching current is assumed) and OFF for pause (see 203 in FIG. 2) are also given to control operations of the compressor motor 32 so that a difference ($\Delta T$) may properly correspondent to how to operate the motor 32.

During rising and falling changes of the room temperature, at a boundary temperature between two adjacent zones, operations thereof are prone to get unstable, for which the hysteresis is provided to act for 0.5 degree in operations.

Thus, once a preset temperature (TO) is determined, a code index for operation of the compressor motor 32 is decided in reference to a then-room temperature and then 4 bit digital signal based on the code will be output from the memory 41 to the memory 42.

At the time of starting up the air-condition, in the event that the condition is at zone 10, that is, cold, the compressor motor 32 is in full operation to attain urgent warming until the present temperature TO is reached.

Referring to the control in response to a room temperature change in time after the start-up, in the event of a fall for one rank in the temperature zones Z0–Z10, for instance, by change of opening or closing a window, the frequency code will be increased one rank, and for one rank rise in temperature, the code will be decreased one rank. In this control, an elapsed time is determined by the timer unit 18 which will act depending on the output EQ, wherein EQ indicates a change in the temperature zones Z0–Z10, and wherein the output UD indicates where to change. The memory 41 will change its output 411 (signal to the memory 42) in response to the output from the timer unit 18 and the signal by UD indicating where to change.

Then, the control method to be applied to directly response to a change of temperature control method to be applied for a start-up, or control method to be applied for a change of temperature in time is, as described above, distinctively indicated by the output MD. Accordingly, in each case of the above methods, compilation of fuzzy reasoning data was assumed to be previously performed with use of a computer to compute the resultant operative data, which was then stored in the memory 41.

Turning to rotation speeds of the fan motor 31 mounted in the indoor units, this speed is determined by the fuzzy reasoning based on a frequency code and a temperature of the heat exchanger. That is, the speed of the fan motor 31 is determined by fuzzy reasoning in the memory 42 which receives the outputs from the sensor 14 provided to sense the temperature of the heat exchanger. However, there are two ways to operate the fan motor 31; an auto mode and a manual mode, which is given in a 2 bit signal from the manually operative panel 13.

The heat exchanger has eight temperature zones of Na to Nh, and FIG. 2 shows the operative manner of the heat exchanger in the case of the auto mode. As shown therein, the fan motor stays in pause when a temperature is so low, which is shown by the mode or parameter Na. Generally, as the temperature of the heat exchanger rises and as the speed of the compressor motor 32 rises, the fan motor is controlled to turn faster.

Figure 3:
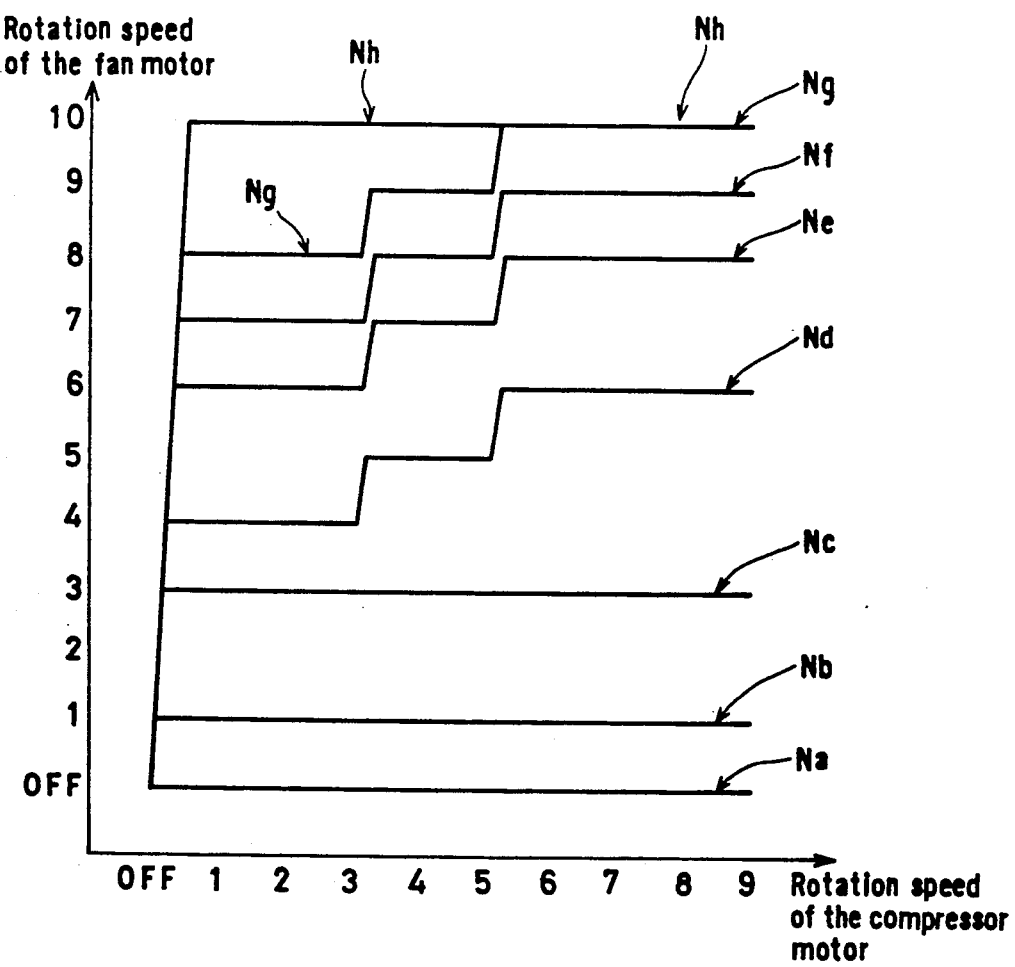
FIGS. 3 and 4 show rotation speeds taken by a fan motor in response to temperatures of a heat exchanger and rotation speeds of a compressor motor.
Figure 4:
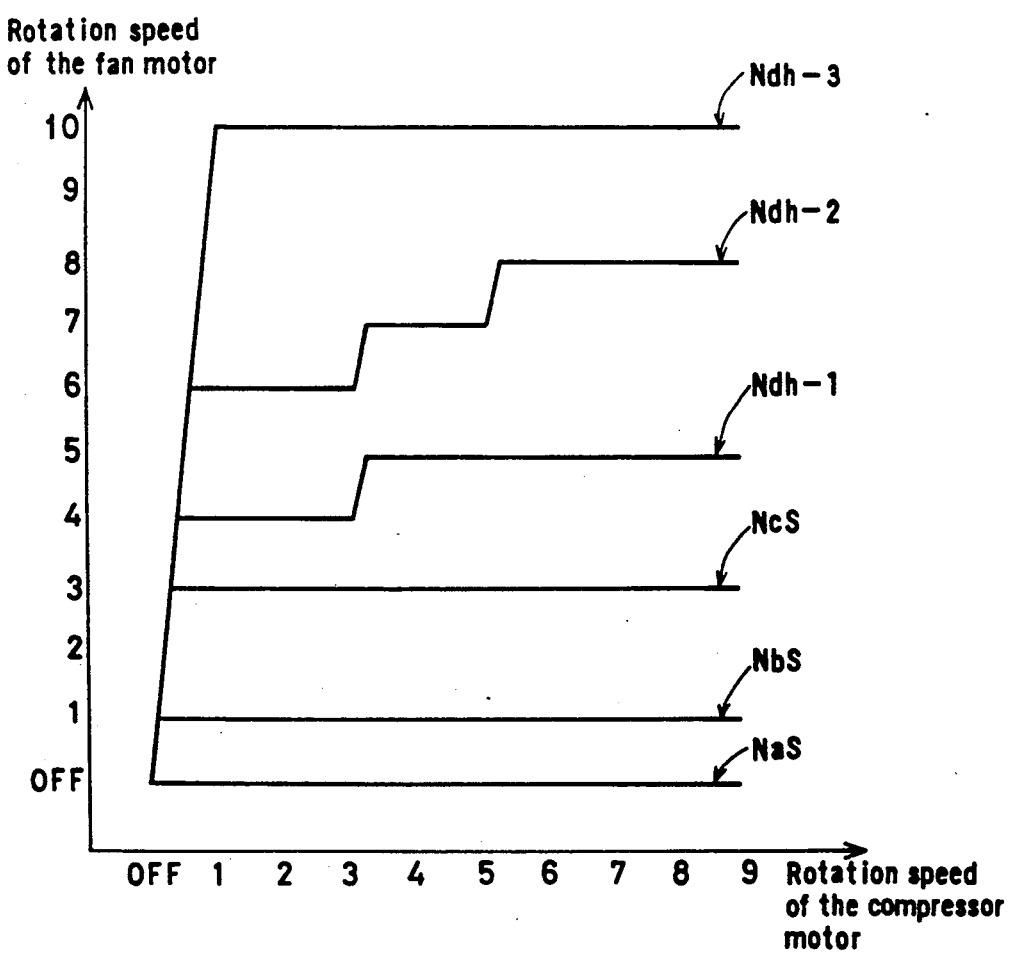

For manual control, as shown in FIG. 3, while a temperature zone of the heat exchanger stays at the lowest three levels (indicated by NaS to NcS), a speed of the fan motor is only dependent on the rise of the temperature of the heat exchanger. While the temperature of the heat exchanger stays over the indicated lowest range, the fan motor is controlled according to the parameter Ndh-1 in the case of slight wind, and likewise, according to the Ndh-2 in the case of weak wind and according to the Ndh-3 in the case of strong wind.

The data indicating speeds of the fan motor 31 and the data indicating speeds of the compressor motor 32 are computed based on fuzzy reasoning by the memory 42 which receives the output 411 from the memory 41 which is related to speeds of the compressor motor 32 and also receives outputs from the manually operative panel 13 and the temperature sensor 14. The resultant data at the memory 42 is sent to the drive circuits 19, 20 as operative data. In order to attain this function with the memory 42, prior compilation on the fuzzy reasoning data by a computer was assumed to be performed in response to the output 411 from the memory 41, data from the A/D convertor 17, and data from the manual panel 13 and the compiled data was previously stored in the memory 42.

The drive circuits 19, 20 are designed, in response to outputs or operative data from the memory 42, to control the drive of the fan motor 31 and the compressor motor 32. The compressor motor 32 is adapted to change its rotation speeds according to indoor temperature and changes over time. The fan motor 31 is adapted to change its rotation speeds according to preset modes as well as temperature of the heat exchanger.

It is to be noted here that this invention should not be limited to the embodiment described above which illustrates application of the inventive memory sector for air-conditioning, but can be applied to any control tasks. Further, in the embodiment, the memory sector comprises two memory elements, though, three or more elements may be employed as required, wherein the memory sector may be comprised of RAM elements and fuzzy reasoning data resident in the RAM elements may be converted or changed by input new fuzzy data during operations in order to comply with new objective entities.

What is claimed is:

1. A programmable logic circuit comprising:
   digital converting means for converting input data into digital form and for outputting signals;
   latching means, connected to said digital converting means, for receiving said signals from said digital converting means and a latch timing and for outputting delayed signals based on said latch timing;
   memory means, connected to said digital converting means and said latching means, for prestoring operative data based on fuzzy reasoning, said memory means for outputting said prestored operative data based on said signals from said digital converting means and said delayed signals from said latching means; and
   feedback means, connected to said memory means, for feeding back said prestored operative data from an output of said memory means to an input of said memory means, said feedback means including timing means for delaying feedback of said prestored operative data for predetermined time periods, wherein said memory means outputs said prestored operative data based on a trend of said prestored operative data and delayed prestored operative data.

2. A programmable logic circuit according to claim 1 wherein said digital converting means includes analog to digital converters, a comparison circuit and a second latch circuit.

* * * * *